US006728485B2

United States Patent
Pfeiffer

(10) Patent No.: US 6,728,485 B2
(45) Date of Patent: Apr. 27, 2004

(54) OPTICAL NETWORK

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 486 days.

(21) Appl. No.: 09/816,380

(22) Filed: Mar. 26, 2001

(65) Prior Publication Data
US 2001/0050791 A1 Dec. 13, 2001

(30) Foreign Application Priority Data
Mar. 28, 2000 (DE) .......................... 100 15 099

(51) Int. Cl.[7] .............. H04B 10/20; H04J 4/00
(52) U.S. Cl. .................. 398/74; 398/77; 398/59
(58) Field of Search .................. 398/59, 66, 72, 398/77, 75, 78, 83, 47, 69, 71, 58, 82, 46, 74

(56) References Cited

U.S. PATENT DOCUMENTS

| 4,989,199 A | * | 1/1991 | Rzeszewski ........... 398/46 |
| 5,221,983 A | * | 6/1993 | Wagner ................ 398/72 |
| 5,936,754 A | * | 8/1999 | Ariyavisitakul et al. ...... 398/28 |
| 6,025,944 A | * | 2/2000 | Mendez et al. ........... 398/78 |

OTHER PUBLICATIONS

Kitayama et al., "Optical Code–Wavelength Conversion for Hybrid OCDM/WDM Networks", Sep. 20–24, 1998, ECOC'98, pp. 339–340.*

* cited by examiner

Primary Examiner—Leslie Pascal
Assistant Examiner—Dalzid Singh
(74) Attorney, Agent, or Firm—Sughrue Mion, PLLC

(57) ABSTRACT

An optical network for transmitting optical data signals is proposed, wherein a first network operates with a WDM method, a second network used a CDM method and a third network uses a time-division multiplex method.

3 Claims, 3 Drawing Sheets

OPTICAL NETWORK

BACKGROUND OF THE INVENTION

Optical networks for transmitting optical data signals are known from the literature. In principle, a basic distinction is made between access networks and transport networks for the transmission of data. The access networks, which ensure access to the consumer are characterised by complex network structures. The variety of systems of these predominantly service-specific access systems is very wide. Within a communications network the access network has the task of providing the subscribers with access to switching equipment, for example servers. From its location, each subscriber first has to be connected to a supply node so that it can actually take advantage of the services on offer. Generally, all communication means are suitable for the subscriber connection. In the long-distance network the telecommunication traffic is concentrated in point-to-point circuits between the various network nodes and switching nodes. On the other hand, in the access network very different requirements have to be met. Standardised functions (BORSCHT) have to be implemented for the technical interaction between the subscriber exchanges and the local ends. The subscribers themselves are not distributed homogeneously over the entire access area, rather there are local areas with high subscriber densities but also areas in which the subscribers occur sparsely. Depending on the respective communications requirement, a distinction can be made between very different subscriber groups such as private customers and smaller or larger business customers to whom suitable transmission solutions have to be offered. The access networks in particular require a large capital investment on the part of the network operator. The components are exposed to environmental effects and in every case have to be individually available to the subscribers of the access network.

SUMMARY OF THE INVENTION

The network structure according to the invention, which takes account of the above-mentioned observations, is introduced in order to improve the economy of access networks.

The proposed optical network has the advantage that simple components are employed in the access area. In addition, due to the combination of different transmission methods, a high degree of flexibility is provided for modifications in the access area. The costs of translating from one transmission method to another transmission method are reduced by the use of new types of converters. The optical network according to the invention combines in the access area a time-division multiplex method in one network layer with a code-division multiplex method in a second network layer. Furthermore, the optical network is expanded to a wavelength-division multiplex method at the inner city level. The connection from the subscribers to the central switching centre is made in the entire network and is exclusively optical. The connection to a transport network is only made from the last network layer, the wavelength-division multiplex network layer, whereby the incoming optical signals are received, electrically regenerated and converted in accordance with the requirements of the transport network.

Advantageous developments and improvements of the optical network stated in the main claim can be achieved by means of the measures listed in the sub-claims.

The use of a special converter for the conversion of time-division multiplex signals to code-division multiplex signals is particularly advantageous. This converter represents a cost-effective solution to realise a conversion from time-division multiplex to code-division multiplex signals. In this case the conversion is effected exclusively along optical paths.

BRIEF DESCRIPTION OF THE DRAWINGS

Exemplary embodiments of the invention are illustrated in the drawings and explained in further detail in the following description.

The drawings show.

DETAILED DESCRIPTION OF THE INVENTION

Figure 1:
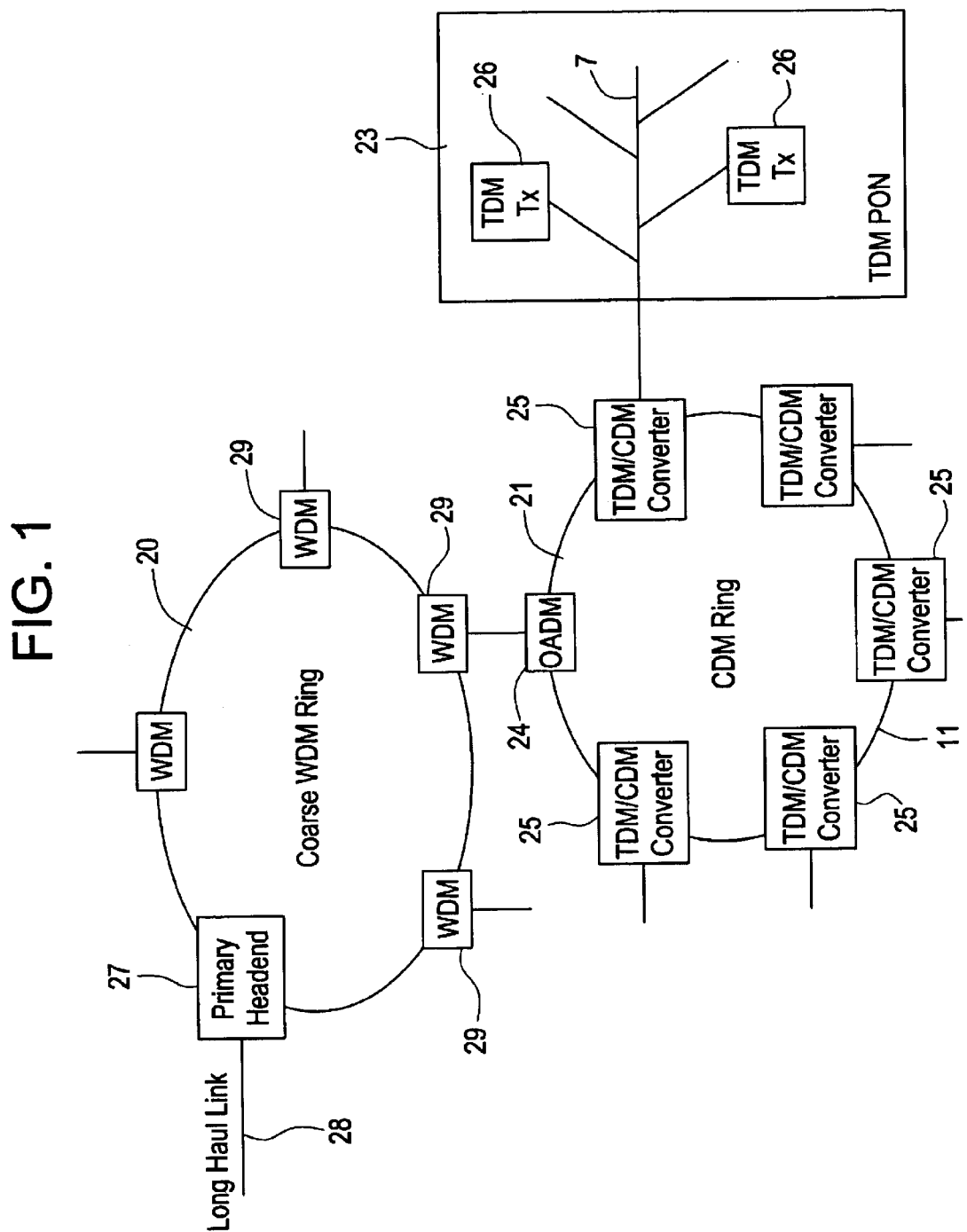
FIG. 1 shows an optical network according to the invention.

FIG. 1 shows an overview of the optical network according to the invention. A first network layer 20 is shown as a ring circuit in which WDM (wavelength-division multiplex) line units 29 are integrated. These WDM line units 29 can be transmitters, receivers or node points to other ring systems. The WDM ring contains a line unit (head end) 27 that is connected to a transport network 28. A second network layer 21 is connected via one of the WDM line units 29. The connection is made via one of the WDM line units 29 and an optical add-drop module 24. Converters 25 are integrated in the second network layer 21, that is represented as a CDM (code-division multiplex) ring. Each of the converters 25 is connected to a local access circuit of a third network layer 23. Transmitters 26 are connected to a transmission line 7 within the third network layer. The transmitters 26 are designed for the transmission of time-division multiplex signals.

Figure 2:
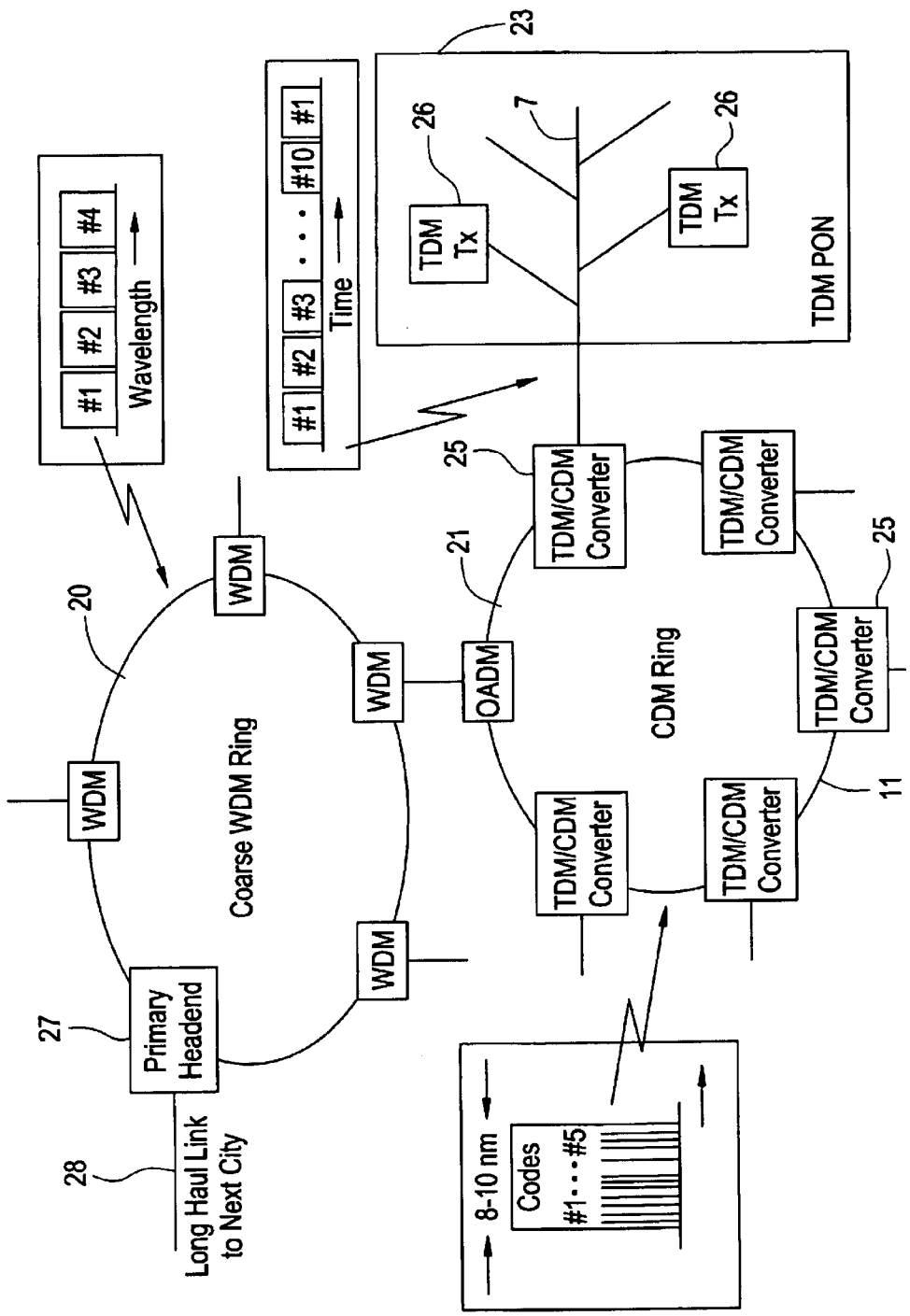
FIG. 2 shows an example of the design of an optical network.

FIG. 2 shows the same network structure, an exemplary embodiment of channel allocations being included. The transmitters 26 in the third network layer 23 operate with a time-division multiplex method. In one embodiment the transmitters 26 transmit at a data transfer rate of 2.5 Gbit/s with reference to their respective time slot to be assigned to it. For example, different transmitters can be operated with different subscribers on such a transmission line 7. The transmitters are laser diodes whose intensity can be modulated in any known manner. The time-division multiplexed signals are converted in the converter 25. A CDM channel is allocated to each converter. In the exemplary illustration, 5 converters are used for the connection of 5 respective time-division multiplex layers. The CDM signals are coded on a wavelength bandwidth of 8 to 10 nm. In the chosen numerical example this gives a data transfer rate of 5×2.5 Gbit/s that is 12.5 Gbit/s continuous data transfer rate. Via the optical add-drop module 24 the coded wavelength band from 8 to 10 nm is multiplexed in the first network layer 20 as a wavelength band of the wavelength-division multiplex. In the selected example, 4 optically-coded CDM layers are connected to the first network layer 20, the WDM ring. As a result, data transfer rates of 4×12.5 Gbit/s or 50 Gbit/s are possible at a bandwidth of 40 nm. In the selected example, the number of channels which can be transmitted by such an optical network amounts to 200. Here the peak data transfer rates are 2.5 Gbit/s with an average value of 250 Mbit/s per channel. The above-mentioned applies in reverse to the data flow between the first network layer 20 and the third network layer 23 (downwards direction). For example, 4 WDM laser transmitters, each with 12.5 Gbit/s per transmitter, are used on the first network layer 20. In each case the laser is tuned to the wavelength band of an individual CDM ring of the second network layer 21. The conversion between CDM and TDM signal is carried out in the converter 25 by analysis of the CDM signal and multiplexing into a TDM signal.

Figure 3:
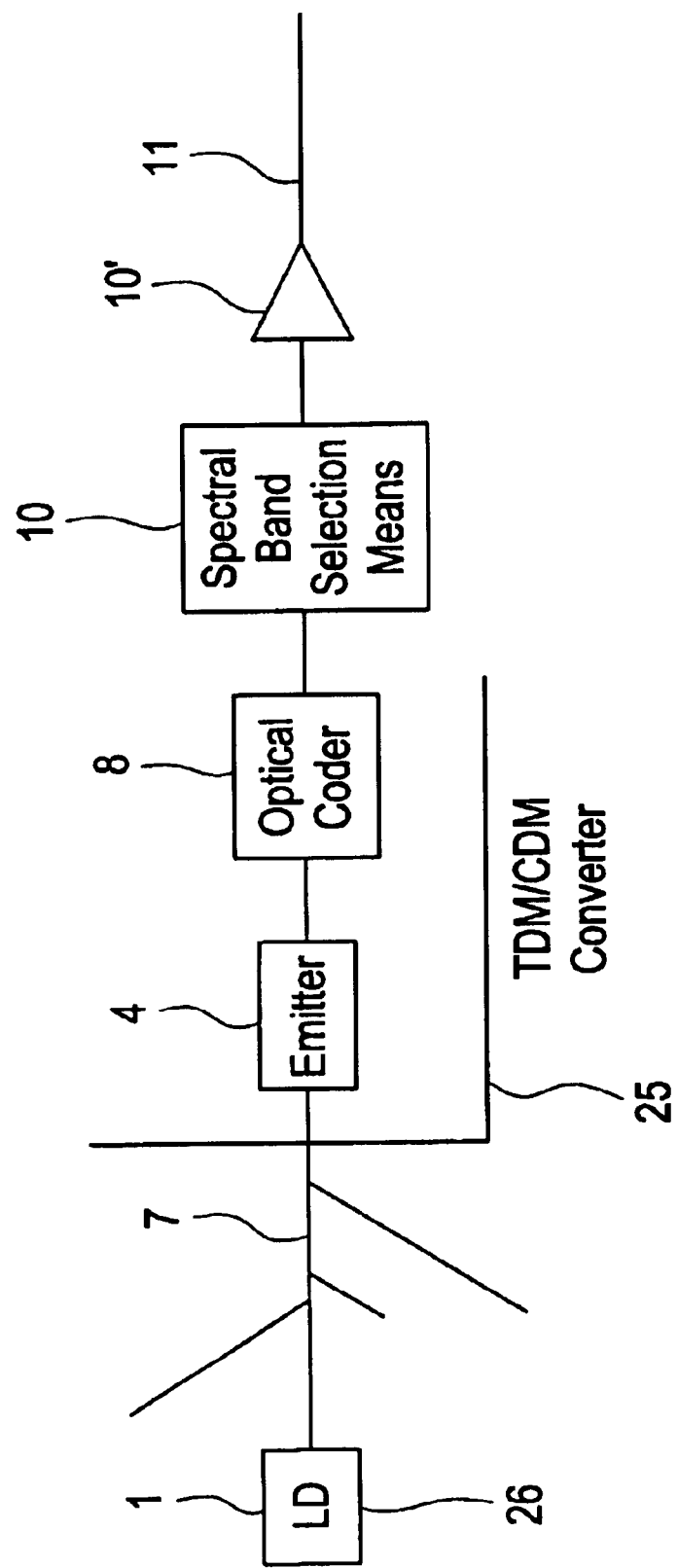
FIG. 3 shows a section from the second and third network layers.

FIG. 3 shows a possible way of realising the connection between the second network layer 21 and the third network layer 23. A laser light source 1 in a transmitter 26 is connected to a converter 25. The converter 25 has several inputs as well as one output. Inputs and outputs alike are connected to optical transmission links 7, 11. The various laser sources of the transmitter 26 are at the input end. The transmission link 11 connects the converter 25 to an optical add-drop module 24. The optical inputs of the converter 25 are connected to an emitter 4 for broadband light and then to an optical coder 8. The coder 8 is connected to spectral band selection means 10. The output of the band selection means 10 is connected to the input of an amplifier 16. In another embodiment the WDM band selection is only effected in the OADM 24 or the associated WDM coupler, respectively. The output of the amplifier 16 is connected to the transmission link 11. Reference is made to patent application 100 . . . for an understanding of the broadband light source comprising modulated laser and an emitter for amplified spontaneous emission (ASE). The laser diode 1 in the transmitter 26 always transmits its modulated data in a time slot. In the converter of the transmission system the incoming signal is connected to an emitter 4 for amplified spontaneous emission, for example a semiconductor amplifier. The conversion from a narrow-band signal to a broadband signal is provided by this stage. The broadband signal can then be optically coded, in which case different optical filters such as Fabry-Perot filters or Mach-Zehnder filters can be used. The transmission link is linked to the third network layer 23 over a narrow band via time-division multiplex signals. The third network layer in particular is difficult to define with respect to the dispersion effects due to different environments and transmission links of different lengths. Due to the transmission of the signals with optically narrow-band signals, the third network layer is insensitive to fluctuations in the environmental conditions and can be simply adapted to the subscribers' requirements. The different time-division multiplexed signals of the third layer 23 are combined together via the second network layer 21 by optical coding. The number of available channels in the subscriber area can be considerably increased as a result. Here the use of an emitter for amplified spontaneous emission (ASE) is a simple, cost-effective optical option for signal conversion. The number of channels is again considerably increased by the conversion in the first network layer with wavelength-division multiplex. The wavelength-division multiplex used, with wavelength bands of the order of 8 to 10 nm, also enables simple optical filters to be employed. It is not necessary to stipulate a strict selection of the components used and a strict wavelength specification. Nor is it necessary in the optical network according to the invention to apply special specifications to the transmitters in the subscriber stations. Here it is particularly advantageous to use low-cost laser diodes as transmitters. The conversion in the converters is also insensitive to fluctuations in the environmental conditions. Temperature fluctuations and different tolerances in the specification of the components are also uncritical for wavelength-division multiplex since wide wavelength bands are used. The conversion of the 20 CDM/WDM channels at the transport network 28 in the example explained above is carried out centrally in the line unit (head end) 27. The multiplexing into corresponding TDM signals for the transport network is done electronically.

What is claimed is:

1. An optical network for transmitting optical data signals, having a first network layer (20), that operates with a WDM method, and has connections to a second network layer (21) via optical Add/Drop modules (24), wherein the second network layer (21) comprises a data network using an optically-coded multiplex method (CDM) and has converters (25) for converting from time-division multiplex (TDM) signals to CDM signals and vice versa, and wherein the converters (25) are connected to a third network layer (23) that uses a time-division method (TDM) for the data transmission.

2. An optical network according to claim 1, characterised in that the first network layer (20) uses a number of WDM wavelength bands that corresponds to the number of the connected data networks of the second network layer.

3. An optical network according to claim 1, characterised in that the converters (25) contain an emitter (4) for amplified spontaneous emission (ASE) with downstream optical coder (8), to which TDM signals of the third network layer are applied at the input end.

* * * * *